(12) United States Patent
Anvin

(10) Patent No.: US 8,458,437 B2
(45) Date of Patent: *Jun. 4, 2013

(54) SUPPORTING MULTIPLE BYTE ORDER FORMATS IN A COMPUTER SYSTEM

(76) Inventor: H. Peter Anvin, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,469

(22) Filed: Mar. 2, 2012

(65) Prior Publication Data

US 2012/0246413 A1 Sep. 27, 2012

Related U.S. Application Data

(63) Continuation of application No. 12/030,149, filed on Feb. 12, 2008, now Pat. No. 8,156,308, which is a continuation of application No. 10/830,921, filed on Apr. 23, 2004, now Pat. No. 7,330,959.

(51) Int. Cl.
G06F 12/00 (2006.01)
(52) U.S. Cl.
USPC .......................... 711/206; 711/202; 711/203
(58) Field of Classification Search
None
See application file for complete search history.

(56) References Cited

U.S. PATENT DOCUMENTS

| 5,519,842 A | 5/1996 | Atallah et al. |
| 5,687,337 A | 11/1997 | Carnevale et al. |
| 5,758,166 A | 5/1998 | Ajanovic |
| 5,781,763 A | 7/1998 | Beukema et al. |
| 5,928,349 A | 7/1999 | Loen et al. |
| 5,968,164 A | 10/1999 | Loen et al. |
| 6,341,345 B1 | 1/2002 | Auslander et al. |
| 2002/0069339 A1 | 6/2002 | Lasserre et al. |

OTHER PUBLICATIONS

Intel, "IA-32 Architecture Software Developer's Manual, vol. 3: System Programming Guide," 1997-2007, Intel Corporation, PO Box 5937, Denver, CO 802-9808; http://www.intel.com, Entire Document.

Undy, S. et al., "A Low-Cost Graphics and Multimedia Workstation Chip Set," IEEE Micro, vol. 14, Issue 2, Apr. 1994, pp. 10-22.

*Primary Examiner* — Matthew Bradley

(57) ABSTRACT

Method and system for supporting multiple byte order formats, separately or simultaneously, are provided and described. In one embodiment, a page attribute table (PAT), which is programmable, is utilized to indicate byte order format. In another embodiment, a memory type range register (MTRR), which is programmable, is utilized to indicate byte order format.

26 Claims, 7 Drawing Sheets

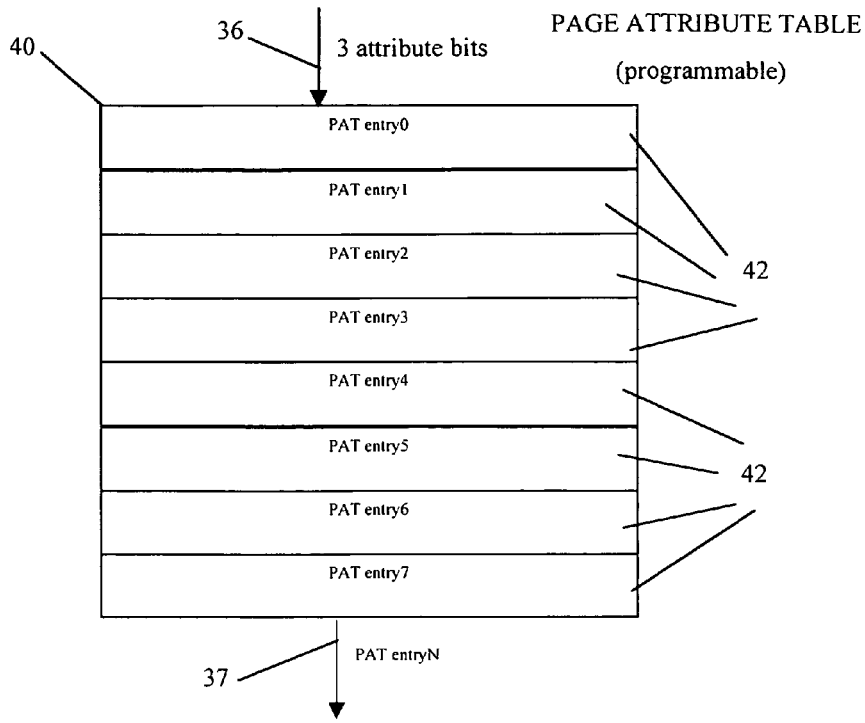

Figure 4A

AVAILABLE MEMORY TYPES AND
AVAILABLE BYTE ORDER FORMATS

WB-BE (BIGENDIAN)
WB-LE (LITTLEENDIAN)
WT-BE (BIGENDIAN)
WT-LE (LITTLEENDIAN)
WP-BE (BIGENDIAN)
WP-LE (LITTLEENDIAN)
WC-BE (BIGENDIAN)
WC-LE (LITTLEENDIAN)
UC-BE (BIGENDIAN)
UC-LE (LITTLEENDIAN)
UC⁻-BE (BIGENDIAN)
UC⁻-LE (LITTLEENDIAN)

Figure 4B

UTILIZED MEMORY TYPES AND
UTILIZED BYTE ORDER FORMATS

WB-BE (BIGENDIAN)
WB-LE (LITTLEENDIAN)
WT-BE (BIGENDIAN)
WT-LE (LITTLEENDIAN)
WC-BE (BIGENDIAN)
WC-LE (LITTLEENDIAN)
UC-BE (BIGENDIAN)
UC-LE (LITTLEENDIAN)

SUPPORTING MULTIPLE BYTE ORDER FORMATS IN A COMPUTER SYSTEM

CROSS-REFERENCE TO RELATED APPLICATIONS

This application is a Continuation of and claims priority to U.S. patent application Ser. No. 12/030,149, filed on Feb. 12, 2008 and now issued as U.S. Pat. No. 8,156,308, which is a Continuation of and claims priority to U.S. patent application Ser. No. 10/830,921, filed on Apr. 23, 2004 and now issued as U.S. Pat. No. 7,330,959, which are hereby incorporated by reference in their entirety.

FIELD

Embodiments generally relate to byte order formats and systems. More particularly, embodiments relate to the field of supporting multiple byte order formats in a computer system.

BACKGROUND

A byte is the smallest addressable unit of storage in a computer system. If a single datum is larger than a byte, it will need to be stored in a sequence of bytes. The system of interpretation of this sequence of bytes is referred to as the byte order format.

Generally, there are multiple types of byte order formats. The most widely used byte order formats are Most Significant Byte First, commonly referred to as bigendian, and Least Significant Byte First, commonly referred to as littleendian. Typically, a particular system (e.g., a computer system) is configured to use a particular byte order format (e.g., bigendian or littleendian). In a bigendian system, the most significant byte of a multi-byte datum is stored at the lowest memory address, the next most significant byte of the data is stored at the next higher address, and so on. Conversely, in a littleendian system, the least significant byte of a multi-byte datum is stored at the lowest memory address, the next least significant byte of the data is stored at the next higher address, and so on. Attempts to design systems capable of using multiple byte order formats (e.g., systems that can use either of the bigendian and littleendian formats, so called bi-endian systems) have led to complicated implementations that reduce system performance.

SUMMARY

Method and system for supporting multiple byte order formats, separately or simultaneously, are provided and described. In one embodiment, a page attribute table (PAT), which is programmable, is utilized to indicate byte order format. In another embodiment, a memory type range register (MTRR), which is programmable, is utilized to indicate byte order format.

BRIEF DESCRIPTION OF THE DRAWINGS

The accompanying drawings, which are incorporated in and form a part of this specification, illustrate embodiments, together with the description, serve to explain the principles of the disclosure.

FIG. 4A illustrates in greater detail the page attribute table (PAT) of FIGS. 1 and 2 in accordance with an embodiment.

FIG. 4B illustrates available memory types and available byte order formats for the entries of the page attribute table of FIG. 1 in accordance with an embodiment.

FIG. 4C illustrates utilized memory types and utilized byte order formats from FIG. 4B for the entries of the page attribute table of FIG. 1 in accordance with an embodiment.

DETAILED DESCRIPTION

Reference will now be made in detail to embodiments, examples of which are illustrated in the accompanying drawings. While the disclosure will be described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

Although the description will focus on the bigendian format and the littleendian format, the description is equally applicable to other byte order formats.

Figure 1:
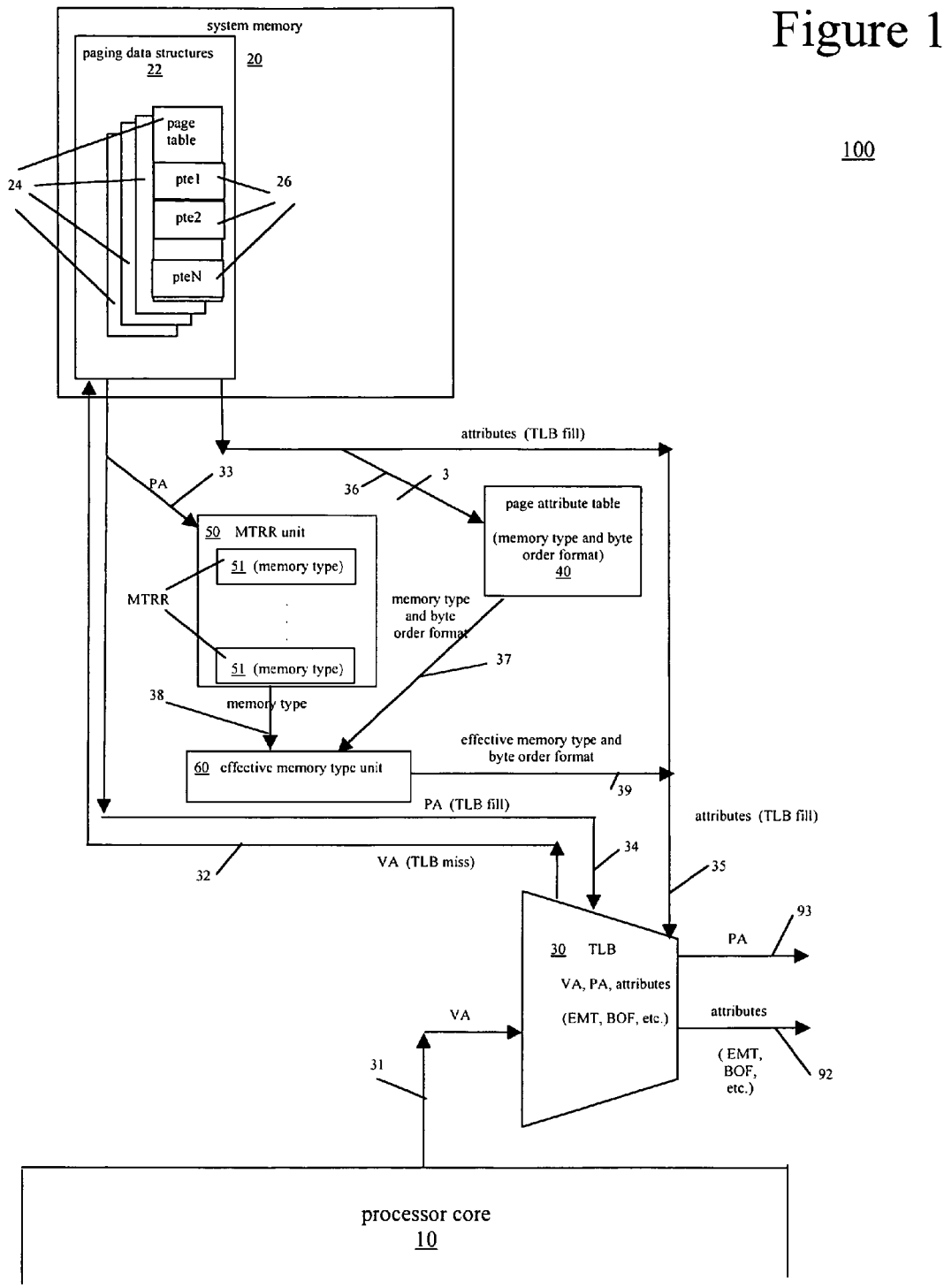
FIG. 1 illustrates a system in accordance with an embodiment, whereas the system supports multiple byte order formats.

FIG. 1 illustrates a system 100 in accordance with an embodiment, wherein the system 100 supports multiple byte order formats, separately or simultaneously. In an embodiment, the system 100 supports concurrent use of the bigendian format and the littleendian format. Rather than incorporating specialized components and specialized signals for handling byte order formats, the system 100 emphasizes compatibility with existing architectures (e.g., the x86 architecture and its variants and derivatives).

As depicted in FIG. 1, the system 100 includes a processor core 10, a system memory 20, and a translation lookaside buffer (TLB) 30. Moreover, the system 100 further has a page attribute table 40, a memory type and range register (MTRR) unit 50, and an effective memory type unit 60. In an embodiment, the system 100 is a computer system.

The system memory 20 includes paging data structures 22. The paging data structures 22 include a plurality of page tables 24. Each page table 24 has a plurality of page table entries 26. When the paging data structures 22 receive a virtual address (VA) via line 32, the paging data structures 22 translate the virtual address (VA) to a physical address (PA) and provide the physical address (PA) via line 34. Moreover, the paging data structures 22 provide attribute bits via line 35, wherein the attribute bits are associated with the provided physical address (PA). These attribute bits specify such attributes as read-only, user-supervisor privileges, cache policy, etc. It should be understood that the address translation can also be performed by hash tables or a software algorithm. A data read operation or a data write operation can be performed in the physical address space using the physical address (PA) provided via line 34.

The translation lookaside buffer (TLB) 30 caches address translations (e.g., virtual address (VA) to physical address (PA)) and attributes associated with the physical address. This increases system performance. Typically, the processor core 10 provides a virtual address (VA) via line 31 to the TLB 30. If there is a TLB hit (meaning that the TLB 30 has the required address translation), the TLB 30 provides the corresponding physical address (PA) via line 93 and the corresponding attributes via line 92. However, if there is a TLB miss (meaning that the TLB 30 does not have the required address translation), the TLB fill operation is performed. The received virtual address (VA) is sent to the memory system 20 via line 32 to obtain the address translation and attributes via lines 34 and 35, respectively, from the memory system 20. As will be described below, the attributes cached by the TLB 30 include the effective memory type (EMT) and the byte order format (BOF) for the physical address (PA).

Figure 5:
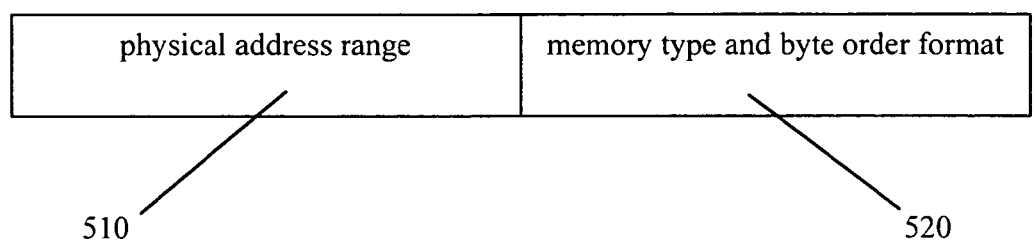
FIG. 5 illustrates in greater detail a format for a memory type range register (MTRR) of FIG. 2 in accordance with an embodiment.

As shown in FIG. 1, the MTRR unit 50 includes a plurality of memory type and range registers (MTRRs) 51. Each MTRR 51 enables the memory type to be specified for various physical address ranges, allowing memory accesses to be optimized for various types of memory such as RAM, ROM, frame buffer memory, memory-mapped I/O devices, etc. The MTRR unit 50 may have several types of MTRRs 51. As an example, one type of MTRR 51 can set the default memory type for various regions of the physical address space. Moreover, another type of MTRR 51 can set the memory type for fixed physical address ranges. FIG. 5 (discussed in connection with FIG. 2) illustrates a format of one type of MTRR 51 in accordance with an embodiment. Other types of MTRRs may have different formats.

The effective memory type (EMT) and the byte order format (BOF) are determined by the page attribute table 40, a memory type and range register (MTRR) 51, and the effective memory type unit 60. In particular, a portion of the attribute bits of line 35 is utilized as an index to the page attribute table 40, which is programmable. In an embodiment, three bits of the attribute bits of line 35 are used via line 36 to index an entry of the page attribute table 40 to select a page-level memory type and a byte order format for the corresponding physical address (PA) of line 34. The memory type and the byte order format are provided via the line 37 from the page attribute table 40. The memory type is the type of caching (or no caching) specified for the corresponding physical address (PA) of line 34. In an embodiment, the byte order format is bigendian or littleendian for the corresponding physical address (PA) of line 34. In general, the operating system of the system 100 programs the page attribute table 40.

There are many techniques that can be utilized for indicating in each entry of the page attribute table 40 the memory type and the byte order format. In one implementation, a first encoding is used for indicating memory type while a second encoding is used for indicating the byte order format. For example, if a particular bit is 0, the byte order format is littleendian. However, if the particular bit is 1, the byte order format is bigendian. Moreover, a code having several bits can indicate the memory type. In another implementation, a single encoding is used to indicate both the memory type and the byte order format.

As shown in FIG. 1, the MTRR unit 50 receives the physical address (PA) via line 33 and provides the PA range-level memory type from a MTRR 51 via line 38. Commonly, the MTRR unit 50 is programmed by software initialization code or BIOS rather than the operating system of the system 100.

Continuing, the effective memory type unit 60 receives the PA range-level memory type via line 38 from the MTRR unit 50 and receives the page-level memory type and the byte order format via the line 37 from the page attribute table 40. Moreover, the effective memory type unit 60 utilizes several precedence rules to determine the effective memory type of the physical address (PA) of line 34. For example, if the PA range-level memory type indicates the physical address (PA) is uncacheable, the page-level memory type cannot be used to enable caching for the physical address. Thus, the effective memory type is uncacheable (UC). Conversely, if the page-level memory type indicates the physical address (PA) is uncacheable (UC), the PA range-level memory type cannot be used to enable caching for the physical address. Further, the effective memory type unit 60 provides the effective memory type and the byte order format via the line 39, wherein the TLB 30 receives the attribute bits provided by the paging data structures 22, the effective memory type (EMT), and the byte order format (BOF) via the line 35.

Figure 2:
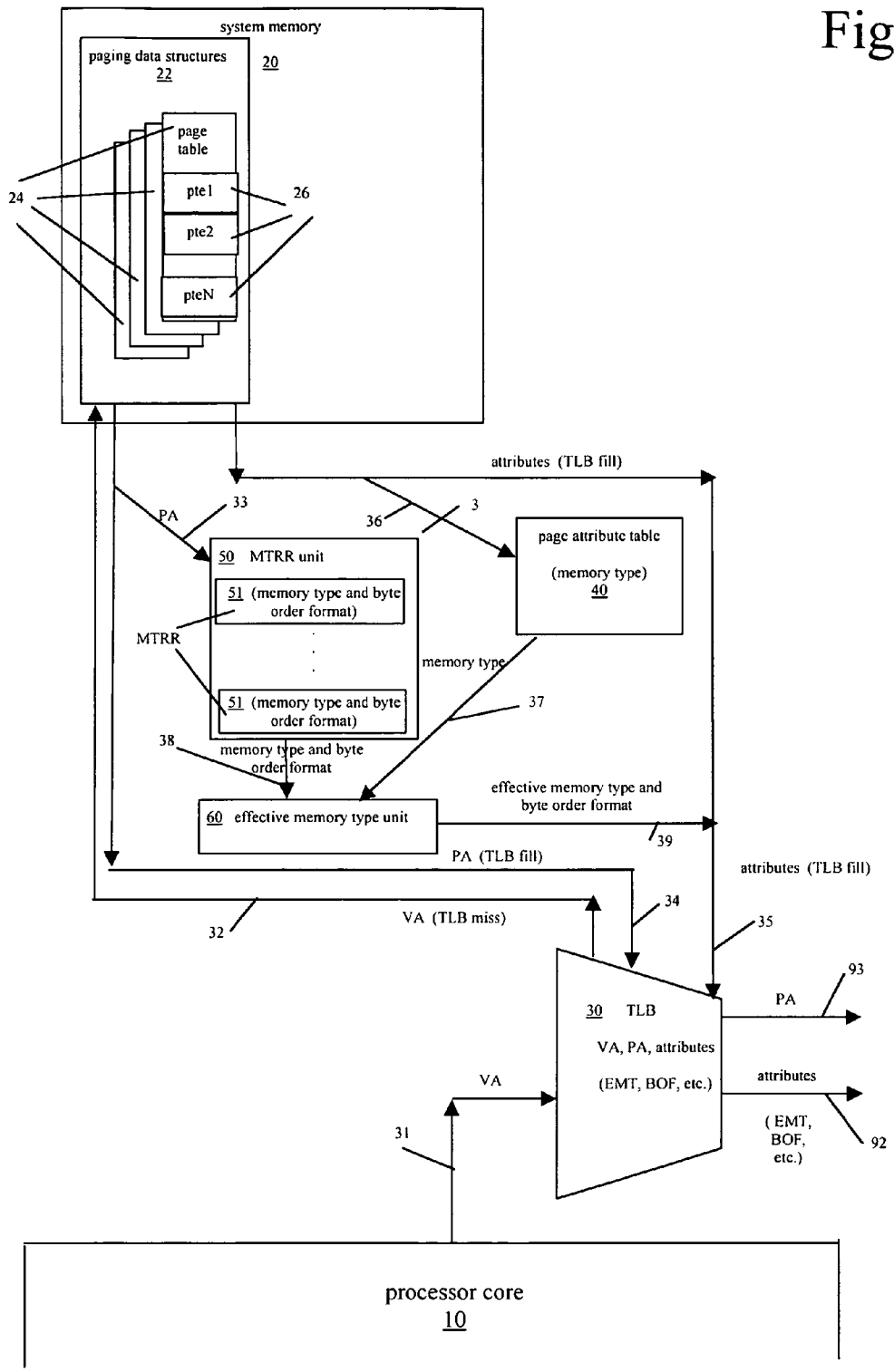
FIG. 2 illustrates a system in accordance with another embodiment, whereas the system supports multiple byte order formats.

FIG. 2 illustrates a system 200 in accordance with another embodiment, wherein the system 200 supports multiple byte order formats, separately or simultaneously. The discussion with respect to FIG. 1 is applicable to FIG. 2 except as noted below. In an embodiment, the system 200 is a computer system.

While the effective memory type (EMT) and the byte order format (BOF) continue to be determined by the page attribute table 40, a memory type and range register (MTRR) 51, and the effective memory type unit 60, this determination is made in a different manner compared to that described with respect to FIG. 1. In particular, while three bits of the attribute bits of line 35 are utilized to index an entry of the page attribute table 40 (which is programmable), the entry of the page attribute table 40 indicates a page-level memory type for the corresponding physical address (PA) of line 34 rather than a page-level memory type and a byte order format for the corresponding physical address (PA) of line 34. The memory type is provided via the line 37 from the page attribute table 40. As discussed above, the memory type is the type of caching (or no caching) specified for the corresponding physical address (PA) of line 34. In general, the operating system of the system 100 programs the page attribute table 40.

Unlike the MTRR unit of FIG. 1, the MTRR unit 50 of FIG. 2 includes MTRRs 51 that enable a byte order format as well as a memory type to be specified for various physical address ranges, allowing memory accesses to be optimized for various types of memory such as RAM, ROM, frame buffer memory, memory-mapped I/O devices, etc. As shown in FIG. 2, the MTRR unit 50 receives the physical address (PA) via line 33 and provides the PA range-level memory type and the byte order format from a MTRR 51 via line 38. In an embodiment, the byte order format is bigendian or littleendian for the received physical address (PA) of line 33. Commonly, the MTRR unit 50 is programmed by software initialization code or BIOS. However, the operating system of the system 100 can be configured to program the MTRR unit 50.

There are many techniques that can be utilized for indicating in the MTRR 51 the memory type and the byte order format. In one implementation, a first encoding is used for indicating memory type while a second encoding is used for indicating the byte order format. For example, if a particular bit is 0, the byte order format is littleendian. However, if the particular bit is 1, the byte order format is bigendian. Moreover, a code having several bits can indicate the memory type.

In another implementation, a single encoding is used to indicate both the memory type and the byte order format.

Continuing, the effective memory type unit 60 receives the PA range-level memory type and byte order format via line 38 from the MTRR unit 50 and receives the page-level memory type via the line 37 from the page attribute table 40. As described above, the effective memory type unit 60 utilizes several precedence rules to determine the effective memory type of the physical address (PA) of line 34. For example, if the PA range-level memory type indicates the physical address (PA) is uncacheable, the page-level memory type cannot be used to enable caching for the physical address. Thus, the effective memory type is uncacheable (UC). Conversely, if the page-level memory type indicates the physical address (PA) is uncacheable (UC), the PA range-level memory type cannot be used to enable caching for the physical address. Further, the effective memory type unit 60 provides the effective memory type and the byte order format via the line 39, wherein the TLB 30 receives the attribute bits provided by the paging data structures 22, the effective memory type (EMT), and the byte order format (BOF) via the line 35.

Figure 3:
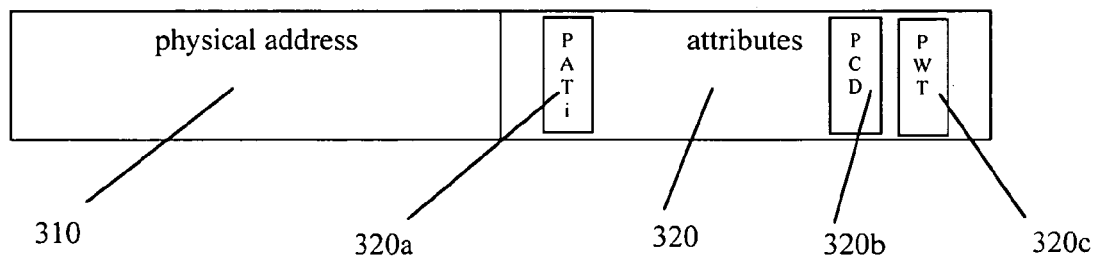
FIG. 3 illustrates a page table entry of FIGS. 1 and 2 in accordance with an embodiment.

FIG. 3 illustrates a page table entry 26 of FIGS. 1 and 2 in accordance with an embodiment. As depicted in FIG. 3, the page table entry 26 has a first portion 310 for the physical address and a second portion 320 for the attribute bits. In an embodiment, the attribute bits include a PATi (page attribute table index) bit 320*a*, a PCD (page-level cache disable) bit 320*b*, and a PWT (page-level write-through) bit 320*c*. The PATi bit 320*a*, the PCD bit 320*b*, and the PWT bit 320*c* are utilized to index the page attribute table 40 of FIGS. 1 and 2. It should be understood that other bits can be configured to index the page attribute table 40.

For compatibility with legacy processors, the page attribute table 40 can be programmed so that the PATi bit 320*a* has no effect, the PCD bit 320*b* controls the caching of individual pages or page tables, and the PWT bit 320*c* controls write-through or write-back caching policy of individual pages or page tables. If migrating from such a configuration, the system software may choose, by programming the page attribute table 40 appropriately, to utilize the PATi bit 320*a* to control the byte order format.

FIG. 4A illustrates in greater detail the page attribute table (PAT) 40 of FIGS. 1 and 2 in accordance with an embodiment. As depicted in FIG. 4A, the page attribute table 40 includes a plurality of entries 42. In an embodiment, the page attribute table 40 has eight entries 42. Three attribute bits (received via line 36) are utilized to index the page attribute table 40 to select one of the entries 42 (output via line 37). While entries of the page attribute table 40 of FIG. 1 indicate a memory type and a byte order format, entries of the page attribute table 40 of FIG. 2 indicate only a memory type.

In an embodiment, the memory type (as specified in the entries of page attribute table 40 of FIGS. 1 and 2 and as specified in the MTRRs 51 of FIGS. 1 and 2) can be strong uncacheable (UC), write combining (WC), write-through (WT), write-back (WB), or write protected (WP). Additionally, the memory type (as specified in page attribute table 40 of FIGS. 1 and 2) can be weak uncacheable (UC-).

The strong uncacheable (UC) memory type indicates system memory locations (identified by physical addresses) are not cached. Weak uncacheable (UC-) memory type has similar characteristics as strong uncacheable (UC), however this memory type can be overridden by programming the MTRRs 51 of FIGS. 1 and 2 for the write combining (WC) memory type. The write combining (WC) memory type indicates system memory locations (identified by physical addresses) are not cached (as with the strong uncacheable (UC) memory type), but writes may be delayed and combined in the write combining buffer to reduce memory accesses.

The write-through (WT) memory type indicates writes and reads to and from the system memory are cached. Moreover, reads come from cache lines on cache hits; read misses cause cache fills from system memory 20. Further, all writes are written to a cache line (when possible) and through to system memory. When writing through to system memory, invalid cache lines are never filled, and valid cache lines are either filled or invalidated.

Continuing, the write-back (WB) memory type indicates writes and reads to and from system memory are cached. Reads come from cache lines on cache hits; read misses cause cache fills from system memory 20. Moreover, write misses cause cache line fills from system memory 20, and writes are performed entirely in the cache, when possible.

Finally, the write protected (WP) memory type indicates reads come from cache lines when possible, and read misses cause cache fills from system memory 20. Writes are propagated to a system data bus and cause corresponding cache lines on all processors on the system bus to be invalidated.

FIG. 4B illustrates available memory types and available byte order formats for the entries of the page attribute table 40 of FIG. 1 in accordance with an embodiment. As shown in FIG. 4B, since there are six memory types described above and since there are two byte order formats (littleendian and bigendian), there are twelve combinations available for the entries of the page attribute table 40 of FIG. 1. As an example, the notation WB-BE indicates that the memory type is write-back (WB) while the byte order format is bigendian. In contrast, the entries of the page attribute table 40 of FIG. 2 can have only one of the six memory types described above.

Since the page attribute table 40 of FIG. 1 has eight entries (described and shown in FIG. 4A), no more than eight of the twelve combinations shown in FIG. 4B can be utilized and programmed into the page attribute table 40 of FIG. 1 at one time. Since the page attribute table 40 of FIG. 1 is programmable, the selected eight permutations can be dynamically changed.

In general, the write-back (WB) memory type, the write combining (WC) memory type, and the strong uncacheable (UC) memory type are widely utilized. Thus, FIG. 4C illustrates an exemplary list of utilized memory types and utilized byte order formats from FIG. 4B for the entries of the page attribute table 40 of FIG. 1 in accordance with an embodiment.

Referring to FIG. 5, a format for a memory type range register (MTRR) 51 of FIG. 2 is illustrated in greater detail in accordance with an embodiment. As depicted in FIG. 5, the MTRR 51 has a first portion 510 for the physical address range and a second portion 520 for the memory type and the byte order format. The second portion 520 can be any one of the twelve combinations listed in FIG. 4B. It should be understood that the MTRR 51 can be configured in other ways, and that other types of MTRRs may exist within the MTRR unit 50.

Figure 6:
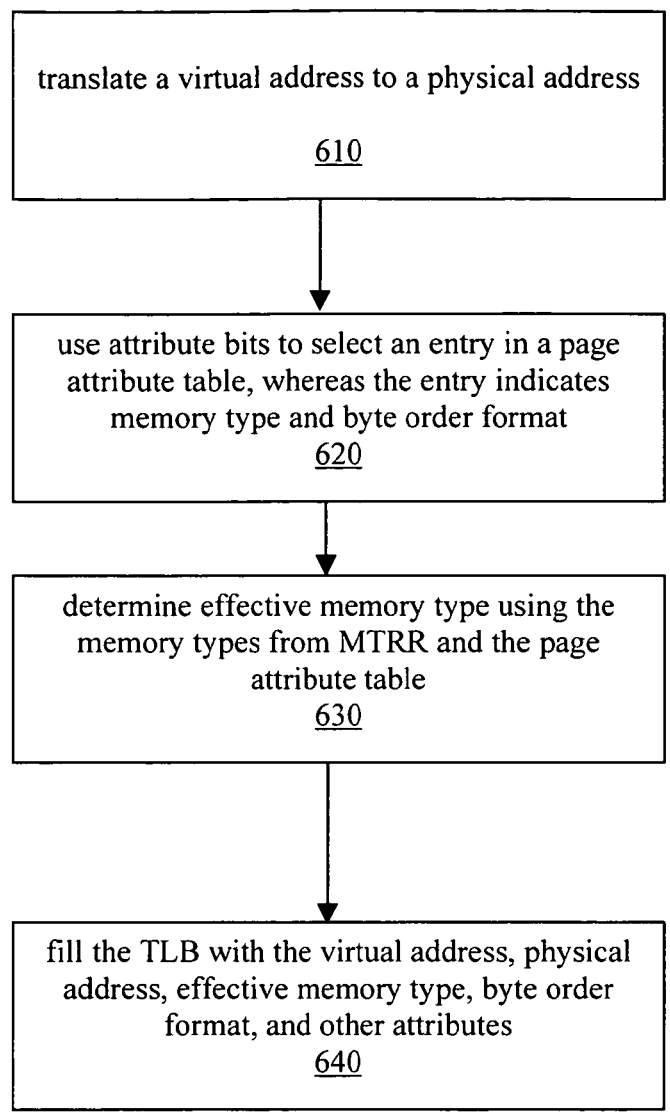
FIG. 6 illustrates a flow chart showing a method of filling a translation lookaside buffer (TLB) of FIG. 1 in accordance with an embodiment.

FIG. 6 illustrates a flow chart showing a method 600 of filling a translation lookaside buffer (TLB) 30 of FIG. 1 in accordance with an embodiment. Typically, a TLB miss causes a TLB fill per this algorithm.

At Step 610, a virtual address is translated to a physical address. Paging data structures 22 such as page tables 26 can be utilized for the address translation. A plurality of attribute bits is associated with the physical address.

Continuing at Step 620, several attribute bits are used to index the page attribute table 40 to select an entry of the page attribute table 40, wherein the entry indicates a memory type and a byte order format for the physical address. Additionally, the physical address is used to obtain the memory type from a MTRR 51 of the MTRR unit 50.

Furthermore, at Step 630, the effective memory type is determined by the effective memory type unit 60 using the memory types from the MTRR 51 and the page attribute table 40.

At Step 640, the TLB 30 is filled with the virtual address, the physical address, the effective memory type (EMT), the byte order format (BOF), and other attributes.

Figure 7:
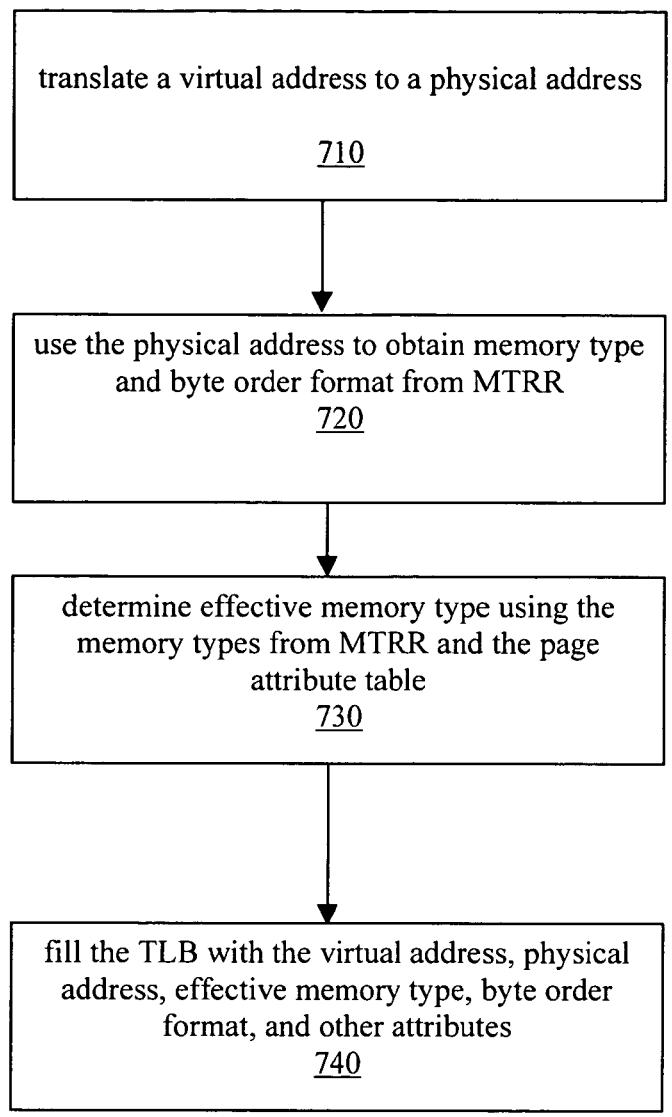
FIG. 7 illustrates a flow chart showing a method of filling a translation lookaside buffer (TLB) of FIG. 2 in accordance with an embodiment.

FIG. 7 illustrates a flow chart showing a method 700 of filling a translation lookaside buffer (TLB) 30 of FIG. 2 in accordance with an embodiment. Typically, a TLB miss causes a TLB fill per this algorithm.

At Step 710, a virtual address is translated to a physical address. Paging data structures 22 such as page tables 26 can be utilized for the address translation. A plurality of attribute bits is associated with the physical address.

Continuing, at Step 720, the physical address is used to obtain the memory type and byte order format from a MTRR 51 of the MTRR unit 50. Moreover, several attribute bits are used to index the page attribute table 40 to select an entry of the page attribute table 40, wherein the entry indicates a memory type for the physical address.

At Step 730, the effective memory type is determined by the effective memory type unit 60 using the memory types from the MTRR 51 and the page attribute table 40.

Furthermore, at Step 740, the TLB 30 is filled with the virtual address, the physical address, the effective memory type (EMT), the byte order format (BOF), and other attributes.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. An apparatus comprising:
a storage device operable to store a page attribute table including a plurality of entries, wherein ones of the entries indicate a byte order format for a physical address, wherein a plurality of attribute bits and a virtual address are associated with the physical address, and wherein a portion of the attribute bits are utilized to select one of the entries.

2. The apparatus of claim 1, wherein the page attribute table is programmable.

3. The apparatus of claim 1, wherein the byte order format is either a bigendian format or a littleendian format.

4. The apparatus of claim 1, wherein the portion of the attribute bits includes a first bit, a second bit, and a third bit.

5. The apparatus of claim 4, wherein the first bit is a PATi (page attribute table index) bit, wherein the second bit is a PCD (page-level cache disable) bit, and wherein the third bit is a PWT (page-level write-through) bit.

6. The apparatus of claim 1, wherein the storage device comprises a register.

7. The apparatus of claim 1, wherein the ones of the entries additionally indicate a memory type.

8. The apparatus of claim 7, wherein the storage device comprises a memory type and range register.

9. A method, comprising:
translating a virtual address to a physical address, wherein a plurality of attribute bits and a respective virtual address are associated with the physical address;
using a portion of the attribute bits to select an entry in a page attribute table, wherein the entry indicates a memory type and a byte order format for the physical address; and
storing the virtual address, the corresponding physical address, and the corresponding byte order format selected from the page attribute table in an entry of a translation lookaside buffer (TLB).

10. The method of claim 9, wherein the page attribute table is programmable.

11. The method of claim 9, wherein the byte order format is either a bigendian format or a littleendian format.

12. The method of claim 9, wherein the portion of the attribute bits includes a first bit, a second bit, and a third bit.

13. The method of claim 12, wherein the first bit is a PATi (page attribute table index) bit, wherein the second bit is a PCD (page-level cache disable) bit, and wherein the third bit is a PWT (page-level write-through) bit.

14. The method of claim 9, further comprising:
determining a corresponding effective memory type by using the memory type selected from the page attribute table; and
storing the corresponding effective memory type in the entry of the TLB.

15. A system comprising:
means for translating virtual addresses into physical addresses;
means for caching address translations from the means for translating, wherein responsive to a miss by the means for caching, a virtual address is translated into a physical address by the means for translating;
first means for storing a plurality of physical address ranges and corresponding type of caching for the plurality of physical address ranges;
second means for storing a plurality of types of caching for physical addresses; and
means for determining, responsive to the miss, an effective memory type for the physical address by using a first type of caching received from the first means for storing and a second type of caching received from the second means for storing, and for sending, responsive to the miss, the effective memory type and a byte order format for the physical address to the means for caching, wherein the means for determining and for sending is operable to receive the byte order format from at least one of the first means for storing or the second means for storing.

16. The system of claim 15, wherein the byte order format is either a bigendian format or a littleendian format.

17. The system of claim 15, wherein the second means for storing includes a plurality of entries programmable to indicate one of a plurality of byte order formats for the physical address and to indicate one of the plurality of types of caching for the physical address, wherein attribute bits associated with the physical address are utilized to select an entry of the second means for storing.

18. The system of claim 17, wherein the attribute bits include a first bit, a second bit, and a third bit.

19. The system of claim 18, wherein the first bit is a PATi (page attribute table index) bit, wherein the second bit is a PCD (page-level cache disable) bit, and wherein the third bit is a PWT (page-level write-through) bit.

20. The system of claim 15, wherein the first means for storing is programmable to indicate one of a plurality of types of caching and to indicate one of a plurality of byte order formats for the physical address ranges, and wherein the physical address is utilized to select the first type of caching and the byte order format from the first means for storing.

21. The system of claim 15, further comprising:
a system memory including the means for translating.

22. A non-transitory computer-readable storage device comprising a plurality of computer-executable instructions stored therein, wherein the computer-executable instructions comprise:
instructions to program entries of a page attribute table to indicate one of a plurality of byte order formats for a physical address and to indicate a type of caching for the physical address;
instructions to retrieve the physical address and a plurality of attribute bits associated with the physical address from a page table responsive to a translation lookaside buffer (TLB) miss;
instructions to use the plurality of attribute bits to select an entry of the page attribute table for the physical address responsive to the TLB miss; and
instructions to assign a byte order format of the entry of the page attribute table and a type of caching of the entry of the page attribute table to the physical address.

23. The non-transitory computer-readable storage device of claim 22, wherein the byte order format is either a bigendian format or a littleendian format.

24. The non-transitory computer-readable storage device of claim 22, wherein the plurality of attribute bits includes a first bit, a second bit, and a third bit.

25. The non-transitory computer-readable storage device of claim 24, wherein the first bit is a PATi (page attribute table index) bit, wherein the second bit is a PCD (page-level cache disable) bit, and wherein the third bit is a PWT (page-level write-through) bit.

26. The non-transitory computer-readable storage device of claim 22, wherein the computer-executable instructions further comprise:
instructions to fill an entry of a translation lookaside buffer (TLB) with the physical address, a virtual address associated with the physical address, the byte order format of the entry of the page attribute table, and the type of caching of the entry of the page attribute table.

\* \* \* \* \*